3,046,270
METHOD OF EXTRACTING GELATIN FROM COLLAGEN-BEARING STOCK BY IRRADIATION AND LIMING
John R. Lowry, White Plains, N.Y., assignor to General Foods Corporation, White Plains, N.Y., a corporation of Delaware
No Drawing. Filed Feb. 25, 1959, Ser. No. 795,333
7 Claims. (Cl. 260—118)

This invention relates to a process for treating collagen-bearing gelatin-precursor materials. More specifically, it relates to the use of ionizing penetrating radiation to treat collagen-bearing materials which are subsequently to be conditioned by liming prior to the extraction therefrom of gelatin.

As is well known to those skilled in the art, gelatin may be extracted from various collagen-bearing raw materials including waste tannage materials. Tanner's stock which is obtained as a by-product from leather manufacturing operations is chiefly cattle skin. Tanner's stock, including hides and trimmings, may be in the form of splits or pieces. Splits usually comprise the flat portions of skin from which the epidermis and flesh have been removed. Pieces consist of trimmings such as cheeking, bellies, etc., and are treated without cutting. Commonly as presented to the gelatin manufacturer, the splits may have been limed by soaking in lime solution.

In the so-called lime splits or other forms of tanner's stock, the valuable collagen which is the precursor of gelatin is found principally in the corium or skin; it also occurs in connective tissue, tendons, etc.

Treatment of tanner's stock usually involves two basic steps, (a) a pretreatment or a conditioning and (b) extraction of gelatin from the conditioned stock. Conditioning typically includes soaking in a solution of lime for 30–120 days depending upon the particular conditions. With proper liming, tanner's stock becomes swollen and soft, the mucins and albumens are dissolved and any remaining grease is saponified. After liming, the lime solution is drained off and the stock is removed from the lime pits. After such additional treatment as may be called for by the particular processing scheme, the conditioned stock may be subjected to gelatin extraction conditions.

Although liming of tanner's stock has long been conducted in this manner, it has always been apparent to those skilled in the art that this technique possessed several defects. The main disadvatage, and many of the others arise out of this, is the need for an extended period of time which may be 30–120 days and which even under the most favorable standard conditions is usually at least 60 days. Because of this, a gelatin plant must devote a substantial amount of floor space to large liming tanks which may be as big as 30 feet across. Plants may have a dozen or more of these large vessels. Furthermore, the length of time between the reception of the tanner's stock at the plant and the passage of this stock to the extraction operation is so long that the plant necessarily has a very large inventory of splits and pieces in the liming baths at a given time. Thus, as a result of the extended liming times, a gelatin plant must spend a considerable initial capital outlay and it must devote a large amount of capital to inventory.

Furthermore from the processing viewpoint, in the current process, liming includes continual replenishment of the tanks with both water and lime, this providing a substantial amount of additional operating cost. Other normal operating costs typified by the expensive agitation of the tanner's stock in the vessels together with manpower requirements results in additional expenses directly chargeable to the liming operations.

Accordingly many attempts have heretofore been made to reduce the time of liming. It is obvious possible to merely shorten the time, but if this be done, it is found that the yield of gelatin is considerably decreased. Various other techniques have been tried from time to time including addition to the liming bath or substitution therefor of other types of chemical treatment, but none of these has been found to be satisfactory.

It is an object of this invention to provide a process for treating collagen-bearing gelatin-precursor materials to permit attainment of a conditioned material in a shorter period of time. It is another object of this invention to provide a liming technique wherein the desired results may be obtained with smaller amounts of lime. Other objects of this invention will be apparent to those skilled in the art.

According to certain aspects of this invention, a collagen-bearing stock which is to be subjected to an extraction operation wherein gelatin is obtained may be conditioned by irradiating the collagen-bearing stock with ionizing penetrating radiation, liming the irradiated collagen-bearing stock, and extracting gelatin from the irradiated collagen-bearing stock.

In practice of this invention, it is possible to use any charge stock which is to be subjected to liming prior to extraction of gelatin therefrom. The preferred collagen-bearing material is lime splits although other types of tanner's stock, e.g. pieces, also be employed. It is preferred that the collagen-containing material which is to be treated by the process of the instant invention be dry; by "dry," it is meant superfically dry or substantially dry. Lime splits as received are considered to be dry although they may contain water adhering thereto and will normally have a total moisture content of about 10%–12%. It is found that substantially improved results are obtained in accordance with this invention when the stock is dry, i.e. no water or moisture is added to the e.g. lime splits to increase the amount of water therein over that found in the charge as received. When the stock is to be irradiated after pretreatment including e.g. washing it will preferably at least be superficially dry i.e. separated from the adhering liquid.

In practice of this invention, the stock so received is subjected to irradiation with ionizing penetrating radiation which includes beta and gamma rays. Beta rays include cathode rays, the former term being the common designation when the rays originate from a naturally or artificially radioactive source, while the latter designation is commonly employed to indicate rays produced in an electrical apparatus e.g. of the vacuum tube type.

The term gamma rays as used herein is intended to include therewithin X-rays. The term "gamma" is commonly employed when the rays originate from a naturally or artificially radioactive source, while the term "X-ray" is commonly used when the rays are continuously produced by electron bombardment of suitable targets in an appropriate apparatus.

The ionizing penetrating radiation which can be used in the process of this invention is that having an energy falling within the range of $10^{-3}$ mev. (million electron volts) up to about 15 mev. When gamma radiation including X-radiation, is employed, the energy thereof will typically fall in the range of $10^{-3}$ mev. up to about 4.0 mev. Typically the wave length of the preferred gamma radiations will be within the range of 0.001 up to about 14 Angstrom units; the frequency may range from about $10^{17}$ to about $10^{21}$ per second.

It has been found that gamma rays emitted by radioactive atoms, particularly atoms which have been artificially rendered radioactive by bombardment thereof with e.g. neutrons are particularly suitable for use in connection with this invention. When gamma radiation from a source is used, the preferred energy ranges of the gamma particles are those falling within the range of $8.8 \times 10^{-3}$ mev. up to 4.0 mev. The wave length of these gamma rays is 0.001 Angstrom unit to about 14 Angstrom units. The frequencies may range from about $10^{+17}$ to about $10^{+21}$ per second.

Cobalt-60, a common source of gamma radiation, may be prepared e.g. by irradiating normal cobalt of atomic weight 59 in a uranium pile wherein neutrons are present. As a neutron strikes an atom of cobalt-59, it forms the artificially radioactive cobalt-60 which emits gamma radiation having an energy of 1.1 and 1.3 mev. The half-life of cobalt-60 is 5.3 years.

Irradiation of the gelatin stock, i.e. the collagen-bearing material may be effected by passing the stock through the radiation beam. The distance between the radiation source and the stock being irradiated may vary, but typically it will be of the order of from 1 inch to about 18 inches. Under these conditions, irradiation may occur for a period ranging from about 5 seconds up to as long as 8 hours. In the case of beta radiation, the time may be as little as 5 seconds and the preferred maximum will not be above 15 minutes. The time of radiation will depend on the strength of the radiation source. In the case of gamma radiation, the preferred range is 15 minutes to 3 hours with best results being obtained at the longer times. The amount of radiation to which the gelatin stock is subjected is measured in terms of the r.e.p. (Roentgen equivalent physical). A r.e.p. is a measure of the amount of radiation falling on a particular material, and is measured by determining the effect upon a standard such as the commonly used methylene blue or iron sulfate indicator, located immediately adjacent to the sample being irradiated. At the conclusion of the radiation experiment, the number of r.e.p.'s supplied to the stock can be determined by comparing the irradiated methylene blue or iron sulfate with a standard non-irradiated sample thereof.

Although some improvement is observed over a wide dosage range, the preferred dosage range is $0.5$–$1.5 \times 10^6$ r.e.p.

The temperature at which radiation is effected may vary; preferably it will be effected at ambient temperatures. No special temperature conditioning of the stock need be provided. Preferably also the stock will be irradiated in dry (i.e. superficially dry) state rather than in mixture with substantial quantities of water.

The collagen-bearing gelatin-precursor material which has been irradiated is then subjected to a liming operation. More specifically, this includes the addition of the irradiated materials e.g. lime splits to a large body of water which contains sufficient lime to treat the stock. It is a feature of this invention that contact with the limed stock be maintained for 15–40 days and preferably about 25–35 days. During this time the mixture of stock and solution is stirred and additional water and lime may be added as required. At the conclusion of the liming operation, the stock is then passed to an extraction operation (preferably after acid treatment to lower the pH to a value of about 1.5–3.5 and further washing). In the extraction operation, the lime splits may be contacted with water which has been preheated to a temperature typically within the range of 50°–95° C. and preferably 65°–75° C. The time of extraction may be of the order of 2 hours and the effluent solution from the extraction will usually contain from about 2%–3% up to about 4%–6% gelatin solids. The effluent gelatin solution may be treated in any suitable manner by addition of various materials to modify the pH thereof. Preferably the pH of the gelatin will be raised to fall within the range of 4–5 although under certain conditions it may be raised to as high as e.g. 7.5. The gelatin extract liquor may be concentrated to desired concentration of e.g. 20–30% and then chilled and dried according to any of the standard techniques to obtain the solid dry gelatin of commerce. It is one of the features of this invention that the so-prepared gelatin may be characterized by substantially improved physical properties. The yield (expressed in terms of Bloom-pound or Bloom-gram yield) is considerably improved and both the Bloom, the viscosity, and the molecular weight of the gelatin obtained may be in excess of the corresponding properties of gelatin which has been extracted from otherwise similarly treated stock which has not been subjected to the process of this invention.

As is well known to those skilled in the art, gelatin is commonly extracted in a series of cooks and there may be as many as six extraction operations performed upon a given stock. The quality of the gelatin obtained from the first extraction or the first two extractions is generally much higher than the quality of the gelatin obtained from subsequent cooks. It is a feature of this invention that the yield of gelatin obtained in the first or the first two cooks (and this represents the most desirable product) may be increased by as much as 40% or 50%; and that the total yield of gelatin extracted may be increased by as much as 10%–15%. Furthermore, the Bloom of the gelatin obtained in the first cook, when prior treatment has been effected in accordance with this invention may be as much as 20% higher than the control sample; the viscosity may for example be typically 10%–12% higher; the molecular weight may also be increased; and the overall Bloom-gram yield may be as much as 15% or 20% higher.

EXAMPLE I

According to this example, which serves as a control, 1500 grams of lime splits (grade excellent) which were superficially dry and which contained 11% moisture (on a dry basis) as received, were limed for 34 days, in sufficient water to cover the stock. 180 grams of lime were added to the stock, and the mixture was stirred. At the end of the 34 days, the limed charge was water washed and then soaked for 12 hours in 0.1 N hydrochloric acid. The material was water washed and subsequently cooked in water at 145° F. for 25 hours at a pH of 2.0–2.8. The extract liquor was then withdrawn from the lime splits and the latter was subsequently subjected to extraction in like manner five more times. Each liquor was separately adjusted to pH 5.5; although this may be done by any technique, it was effected by anion-exchange with IR–45 resin (a resin of the weakly basic polystyrene-polyamine type). The extract liquid was then filtered. The gelatin solutions were then chilled, cut up into small pieces, dried, and ground to a powder. The Bloom, viscosity, and the pH of each of the gelatin products was measured as was the Bloom-gram yield, and the molecular weight.

EXAMPLE II

According to a specific example of this invention, the same quantity and type of lime splits as employed in connection with Example I was treated as Example I except that prior to liming, the lime splits were subjected to gamma radiation emanating from cobalt-60. Radiation was effected by placing the lime splits at a distance of about 2 inches from a 4.5 kilocurie source of cobalt-60, for time sufficient to give a radiation dosage of $1.5 \times 10^6$ r.e.p. as measured by a dosimeter. The irradiated material was then subjected to liming for only 24 days and then acidified and extracted as noted in connection with Example I.

The comparative results of the two examples are tabulated in the Tables I and II.

Table I.—Yields

| Extraction | Control, grams | Irradiated, grams |
|---|---|---|
| First Cook | 172 | 243 |
| Total Yield | 546 | 609 |

In the above table, it may be noted that the yield of gelatin from the first cook (which represents the best quality gelatin) was increased by 41% when the procedure of this invention was followed and that the total overall yield was increased by 11.5%. This represents a significant improvement in yield and especially so when the liming time for the sample treated in accordance with this invention was only 24 days whereas that of the control was 34 days (40% longer).

The properties of the gelatin extracted from the stock are noted in Table II.

Table II

| Property | Control | Irradiated |
|---|---|---|
| Bloom of First Cook | 190 | 230 |
| Bloom (Cooks 1-6 combined) [1] | 185 | 203 |
| Viscosity of First Cook | 20.6 | 23.2 |
| Viscosity (Cooks 1-6 combined) [1] | 34.2 | 43.4 |
| Molecular wgt. (film balance method) | 112,000 | 124,000 |
| Bloom-gram Yield | 101,000 | 124,000 |

[1] Calculated weight average.

From this Table II, it will be observed that the physical properties of gelatin extracted from the stock which has been treated in accordance with this invention are superior in all respects and that the quantity of gelatin obtained is also much greater. Specifically, the improvement in Bloom of the gelatin obtained from the first cook by 40 Bloom is an eminently desirable result especially when coupled with the attainment of a 50% increase in yield as noted in Table I. The increase in Bloom by 18 points of the mixture of all six cooks is also an entirely unexpected result. In this connection it may be noted that it has been well known that it has been possible to increase either the yield or the Bloom from a given extraction operation but only at the expense of the other variable i.e. it has heretofore only been possible to obtain gelatin of increased Bloom by extraction of a smaller amount of gelatin.

It is also apparent from Table II that the viscosity of the gelatin obtained in the first cook, as well as the viscosity in the combined cooks has been increased considerably; that the molecular weight of the gelatin has been increased; and that the Bloom-gram yield (which is a true measure of the efficiency of a process) has been substantially increased by approximately 23%. The Bloom-weight (e.g. Bloom-gram) yield of a given process is obtained by multiplying together the Bloom of the product and the amount.

Although this invention has been described by reference to specific examples, it will be apparent to those skilled in the art that numerous changes and modifications may be made thereto.

This application is a continuation-in-part of application Serial No. 711,554, filed January 28, 1958, for "Process," inventor John R. Lowry.

What is claimed is:

1. The method of extracting gelatin from a collagen-bearing stock which comprises irradiating the collagen-bearing stock with ionizing penetrating radiation having an energy of from about $10^{-3}$ to about 15 million electron volts, liming the irradiated stock and extracting gelatin from said irradiated limed stock.

2. The method of extracting gelatin from lime splits which comprises irradiating the lime splits with ionizing penetrating radiation having an energy of from about $10^{-3}$ to about 15 million electron volts, liming the irradiated lime splits, and extracting gelatin from said irradiated lime splits.

3. The method of extracting gelatin from a collagen-bearing stock which comprises irradiating the stock with ionizing penetrating radiation having an energy of from about $10^{-3}$ to about 15 million electron volts at a dose exceeding $0.5 \times 10^6$ r.e.p., liming the irradiated stock, and extracting gelatin from said irradiated limed stock.

4. The method of extracting gelatin from a collagen-bearing stock which comprises irradiating the stock with ionizing penetrating radiation having an energy of from about $10^{-3}$ to about 15 million electron volts at a dose of $0.5$–$1.5 \times 10^6$ r.e.p., liming the irradiated stock, and extracting gelatin from said irradiated limed stock.

5. The method of extracting gelatin from a collagen-bearing stock which comprises irradiating the stock with ionizing penetrating radiation having an energy of from about $10^{-3}$ to about 15 million electron volts, liming the irradiated charge stock for 15–40 days, and extracting gelatin from said irradiated limed stock.

6. The method of extracting improved yields of high quality gelatin from a collagen-bearing stock which comprises irradiating the collagen-bearing stock with ionizing penetrating radiation having an energy of from about $10^{-3}$ to about 15 million electron volts, liming the irradiated stock, extracting gelatin from said irradiated limed stock in a single cook, and drying the extract liquor from said single cook to obtain a high Bloom-weight yield of gelatin.

7. The method of extracting improved yields of high quality gelatin from a collagen-bearing stock which comprises irradiating the collagen-bearing stock with ionizing penetrating radiation having an energy of from about $10^{-3}$ to about 15 million electron volts at a dose of $0.5$–$1.5 \times 10^6$ r.e.p., liming the irradiated stock for 15–40 days, extracting gelatin from said irradiated limed stock in a single cook, drying the extract liquor from said single cook to obtain a high Bloom-weight yield of gelatin.

References Cited in the file of this patent

UNITED STATES PATENTS 2,557,871    Harnack et al. _____ June 19, 1951

OTHER REFERENCES

Perron et al.: "Nature," pages 863–864, vol. 166, No. 4229, November 1950.

Collinson et al.: "Chemical Review," pages 540–545, vol. 56, No. 3, June 1956.